US009407626B2

(12) United States Patent
Saldhana

(10) Patent No.: US 9,407,626 B2
(45) Date of Patent: Aug. 2, 2016

(54) SECURITY TOKEN MANAGEMENT SERVICE HOSTING IN APPLICATION SERVER

(75) Inventor: Anil Saldhana, Oak Park, IL (US)

(73) Assignee: Red Hat, Inc., Raleigh, NC (US)

( * ) Notice: Subject to any disclaimer, the term of this patent is extended or adjusted under 35 U.S.C. 154(b) by 319 days.

(21) Appl. No.: 13/248,629

(22) Filed: Sep. 29, 2011

(65) Prior Publication Data

US 2013/0086141 A1    Apr. 4, 2013

(51) Int. Cl.
| | | |
|---|---|---|
| *G06F 15/16* | (2006.01) | |
| *G06F 7/04* | (2006.01) | |
| *H04L 29/06* | (2006.01) | |
| *G06F 21/33* | (2013.01) | |

(52) U.S. Cl.
CPC .......... *H04L 63/0815* (2013.01); *G06F 21/335* (2013.01); *G06F 2221/2119* (2013.01)

(58) Field of Classification Search
CPC .............. H04L 63/0815; G06F 21/335; G06F 2221/2119
USPC ..................... 726/203, 9, 6; 713/172; 709/203
See application file for complete search history.

(56) References Cited

U.S. PATENT DOCUMENTS

| | | | | | |
|---|---|---|---|---|---|
| 6,253,325 | B1 * | 6/2001 | Steele | ..................... | H04L 29/06 726/5 |
| 6,314,425 | B1 * | 11/2001 | Serbinis | .............. | G06F 17/3089 |
| 6,587,867 | B1 * | 7/2003 | Miller | ..................... | G06Q 20/10 705/38 |
| 7,577,834 | B1 * | 8/2009 | Traversat | ................ | H04L 67/16 713/156 |
| 7,603,555 | B2 * | 10/2009 | Schmidt | .............. | H04L 63/0209 713/150 |
| 7,702,917 | B2 * | 4/2010 | Tevosyan | ............ | H04L 63/0807 713/185 |
| 8,006,292 | B2 * | 8/2011 | Zhang | .................. | G06Q 20/206 358/1.15 |
| 8,312,272 | B1 * | 11/2012 | Serenyi | ................... | G06F 21/33 713/168 |
| 8,353,019 | B2 * | 1/2013 | Chern | ..................... | G06F 21/33 713/172 |
| 8,392,702 | B2 * | 3/2013 | Qiu | ..................... | H04L 63/0442 380/277 |
| 2002/0087883 | A1 * | 7/2002 | Wohlgemuth | ............ | G06F 8/65 726/29 |
| 2003/0177388 | A1 * | 9/2003 | Botz | ................... | H04L 63/0807 726/10 |
| 2003/0187978 | A1 * | 10/2003 | Nakamura | .......... | H04L 12/2602 709/224 |
| 2006/0119883 | A1 * | 6/2006 | Lovat | .................... | G06F 9/4445 358/1.15 |

(Continued)

*Primary Examiner* — Viet Vu
*Assistant Examiner* — Michael A Chambers
(74) *Attorney, Agent, or Firm* — Lowenstein Sandler LLP

(57) ABSTRACT

Systems and methods for a security token management service hosted in an application server. A set of services and/or associated applications can be served from an application server to one or more clients. The set of services may require one or more token services in order to deliver their intended functionalities, so that for instance an email client may require the use and presentation of a token or other object incorporating user ID, password, or other authentication information for the user to access and retrieve their email messages. Different served applications and/or services may require the installation of various different token types or services, conventionally requiring manually configuration. A centralized security token management service can be installed and configured in the application server itself, which interfaces to requesting services and automatically locates and acquires diverse token types and/or associated token services to support served applications or services.

18 Claims, 4 Drawing Sheets

(56) References Cited

U.S. PATENT DOCUMENTS

| | | | |
|---|---|---|---|
| 2008/0114770 A1* | 5/2008 | Chen | G06F 17/30566 |
| 2008/0313707 A1* | 12/2008 | Jain | H04L 63/08 |
| | | | 726/2 |
| 2009/0031131 A1* | 1/2009 | Qiu | H04L 63/0442 |
| | | | 713/172 |
| 2009/0276840 A1* | 11/2009 | Cao | H04L 9/3226 |
| | | | 726/9 |
| 2010/0088236 A1* | 4/2010 | Karabulut | G06F 21/10 |
| | | | 705/59 |
| 2011/0239283 A1* | 9/2011 | Chern | G06F 21/33 |
| | | | 726/6 |
| 2012/0017259 A1* | 1/2012 | MacCarthaigh | H04L 29/12066 |
| | | | 726/1 |
| 2012/0227098 A1* | 9/2012 | Obasanjo | H04L 63/0815 |
| | | | 726/8 |
| 2012/0260322 A1* | 10/2012 | Logan | G06F 21/33 |
| | | | 726/6 |
| 2013/0067568 A1* | 3/2013 | Obasanjo | H04L 63/0807 |
| | | | 726/20 |

* cited by examiner

SECURITY TOKEN MANAGEMENT SERVICE HOSTING IN APPLICATION SERVER

FIELD

The invention relates generally to systems and methods for a security token management service hosted in an application server, and more particularly, to platforms and techniques for integrating and managing the deployment of token services and associated token objects from a centralized token management service which can be installed in an application server.

BACKGROUND

Application servers are entities in system and network environments in which various applications or services can execute or operate. In particular, application servers are dedicated to the efficient execution of processes, procedures, routines, scripts, and software code for supporting the functionalities of applications and services that can be delivered to users over the Internet and other networks. Software developers can access application servers via various application programming interfaces (APIs).

The Java Platform, Enterprise Edition, Java EE, or J2EE are widely used platforms for server programming in the Java programming language. A J2EE container is a runtime entity that provides services to specialized Java components. Services provided by a container typically include life cycle management, security, deployment, and component-specific services. Containers are used in a wide variety of Java components, such as Enterprise Javabeans (EJB), Web pages, Java Server Pages (JSP), servlets, applets, and application clients.

During operation of a Java EE application server, various services or applications associated with the services may need to be configured by a system administrator or other entity.

In some types of served applications, there may be a need for the use of tokens to manage user authentication, data access, or other purposes. Various applications may call for the use of different types of token services or mechanisms to provide that secure access. Among other things, those different token types and associated services may be supported by different token providers. In known application server platforms, an administrator or other user may be required to manually select and configure token types, including to specify the intended token provider and other details. It may be desirable to provide systems and methods for a security token management service hosted in an application server, in which the acquisition, use, and management of security tokens can be aggregated in a unitary security token service hosted in the application server or other location, while providing the ability to deploy any arbitrary selected token type or provider without a need for complete manual configuration.

DESCRIPTION

Embodiments of the present teachings relate to systems and methods for a security token management service hosted in an application server. In particular, embodiments relate to platforms and techniques for abstracting the management of token services and token objects in a security token management service which can be integrated into an application server, and be made available to sets of services requesting the instantiation of token-based services for applications and/or services which they are providing to a set of clients.

Figure 1:
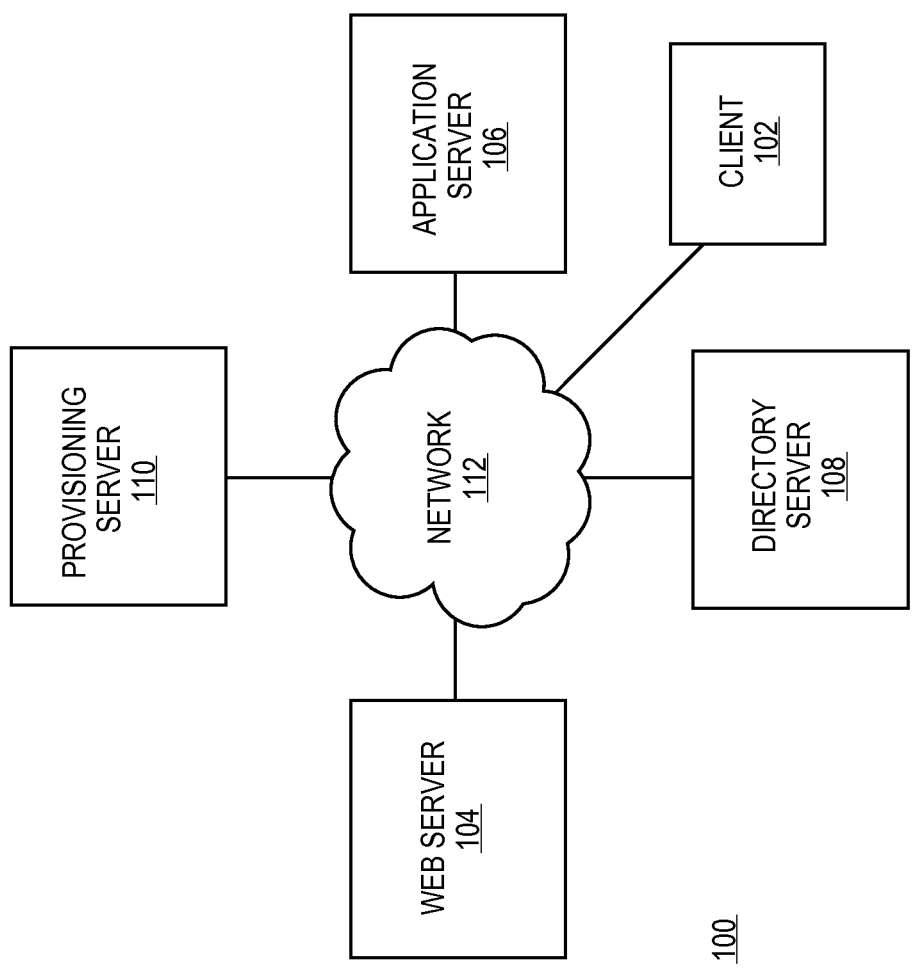
FIG. 1 illustrates an overall system architecture in which various aspects of systems and methods for a security token management service hosted in an application server can be practiced, according to embodiments.

Referring to FIG. 1, illustrated is an exemplary network environment 100 in which the present systems and methods may be implemented. As shown in FIG. 1, the environment 100 can comprise or include a client 102, a web server 104, an application server 106, a directory server 108, and a provisioning server 110. These components can be coupled together via network 112, such as the public Internet and/or other public or private networks. It should be appreciated that other configurations and/or network components are envisioned in accordance with the present teachings.

In embodiments, the client 102 can be any computer system that utilizes the services of another computer system, i.e., the web server 104 and the application server 106. As shown in FIG. 1, the client 102 can be or include implementations known to those skilled in the art, such as a personal computer, laptop computer, personal digital assistant, mobile phone, tablet device, and the like. In embodiments as shown in FIG. 1, the client 102 can be used to run and/or access Web applications via an intermediate application, such as a web browser.

In embodiments, the web server 104 can comprise a computer system configured to accept requests from clients, such as the client 102, and serve responses, services, and/or data or media content. For example, a user of the client 102 can execute a Web application via the web server 104. In the embodiment as shown, the data content served by the web server 104 can comprise one or more Web pages that can include hypertext markup language (HTML) documents and/or XML (extensible markup language)-based objects as well as linked or embedded data or objects such as, for example, digital images, video files, audio files, and the like.

The web server 104 can be implemented on a machine that comprises known processor, memory, and other hardware and software. Well known software for the web server 104 can include, but is not limited to, software such as Apache HTTP Server from the Apache Software Foundation, Internet Information Services by Microsoft Corporation®, and Sun Java System Web Server from Sun Microsystems Inc®. One skilled in the art will recognize that any of the many different Web server programs available are consistent with and can be used with implementations of the present teachings.

The application server 106 can be or include software that provides applications to the client 102. In particular, the application server 106 can be configured to manage security, business logic, and data access for the applications provided to the client 102. In embodiments, the application server 106 can be configured to provide a variety of Web-based and/or other applications, such as e-commerce applications, content management applications, customer relations management applications, email applications, messaging applications, spreadsheet or other quantitative applications, and others.

The application server 106 can be implemented using various known software platforms. For example, the application server 106 can be implemented on the known J2EE platform from Sun Microsystems Inc®. In addition, the application server 106 can comprise middleware configured to enable applications to communicate with peer and/or dependent applications, such as the web server 104, database management systems, etc.

In various embodiments, the application server 106 can be implemented using various known software. For example, the application server 106 can be implemented using software, such WebLogic server from BEA Systems Inc®, JBoss from Red Hat Inc.®, Websphere from the IBM Corporation®, and the like. Accordingly, the application server 106 can implement and deploy the Java programming language and provide Web modules using servlets and JavaServer pages. Other functions or services provided by the application server 106 can also employ Java. For example, business logic provided by the application server 106 can be built into Enterprise JavaBeans (EJBs). J2EE can provide standards for hosting and managing the Web components. In addition, security services, such as authentication and authorization, can be implemented using the Java Authentication and Authorization Service (JAAS) or similar service.

The directory server 108 can represent the components that store and organize information about the users of the system 100 and an administrator of the system 100 to manage the access of those users to the resources of the system 100. In embodiments, the directory server 108 can comprise a database (not shown) or other data store that can store information about named objects that are managed. The directory server 108 can also provide an access interface to the data that is contained in this database. The directory server 108 can be implemented using well known technologies. For example, the directory server 108 can be implemented as an X.509 directory service or Lightweight Directory Access Protocol (LDAP) service. In embodiments, the directory server 108 can be implemented as services from various vendors such as, for example, Red Hat Directory Server from Red Hat Inc.®; Active Directory by the Microsoft Corporation®; Apache Directory Server by the Apache Software Foundation; or Sun Java System Directory Server by Sun Microsystems Inc®.

In embodiments, the provisioning server 110 can be or include processor, memory, and other software or hardware resources that can be configured to listen or monitor for provisioning requests in the system 100, and return provisioning, services, and/or other responses. In some embodiments, the provisioning server 110 can be configured as a service provisioning markup language (SPML) provisioning service provider. The provisioning server 110 can be implemented as a separate software component of the system 100, or can be integrated with other components of the system 100. For example, the provisioning server 110 can be or include a component that is installed as part of the directory server 108.

In embodiments, the network 112 can comprise the communications infrastructure for allowing the client 102, web server 104, and/or other nodes or components to communicate with each other. For example, the network 112 can be or include the public Internet, using the Internet Protocol (IP) suite of standards. The network 112 can, in addition or instead, also include other public or private networks, such as one or more local area networks, or others.

Figure 2:
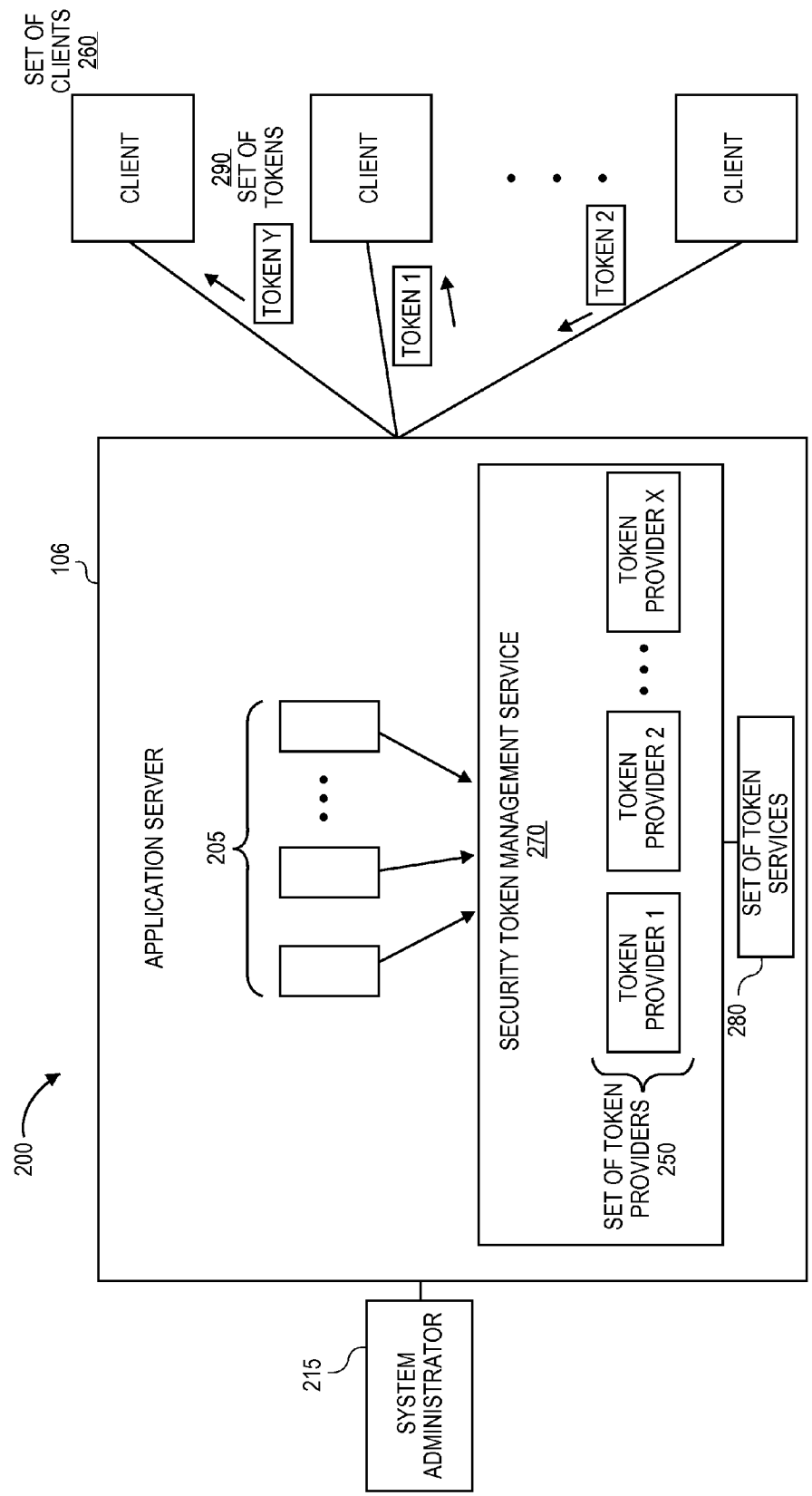
FIG. 2 illustrates an exemplary configuration of components in which various aspects of systems and methods for a security token management service hosted in an application server can be practiced, according to embodiments.

FIG. 2 is an exemplary illustration of an application server environment 200, according to various aspects of the present teachings. It should be appreciated that the environment 200 as illustrated in FIG. 2 is merely exemplary and can comprise other nodes, elements, network connections, and other resources.

As shown in FIG. 2, the environment 200 can comprise an application server 106, which can be configured as described in reference to FIG. 1. In embodiments, the application server 106 can for instance be or include a JBoss™ application server, or other types of application servers. Further, as shown in FIG. 2, the application server 106 can comprise or host a set of services 205. For example, the services can be Enterprise JavaBean (EJB) container services, web container services, security services, web application services, Java Connector Architecture (JCA) services, and other services. In embodiments, each of the set of services 205 can comprise, invoke, and/or execute a set of applications. Further, in embodiments, the set of associated applications can be those that the set of services 205 can serve to a client. In particular, the set of services 205 in conjunction with the set of applications can be configured to provide and manage email, messaging, security, business logic, e-commerce application, content management or media applications, customer relations management applications, database or data access applications, and/or other applications or services for one or more clients, users, and/or customers in the set of clients 260.

As shown in FIG. 2, the environment 200 can comprise a set of clients 260. In embodiments, the set of clients 260 can be configured to connect to the application server 106 via any type of network or data connection. Further, the set of clients 260 can be or include implementations known to those skilled in the art, such as a personal computer, laptop computer, personal digital assistant, mobile phone, tablet device, and the like. Still further, the set of clients 260 be accessed by any user, administrator, owner, or other individual or entity. According to embodiments, the application server 106 can be configured to serve the any of the set of services 205 and any corresponding applications to the set of clients 260. For example, the application server 106 can be configured to serve an email application, media application, and/or messaging application to the set of clients 260.

As shown in FIG. 2, the application server 106 can be configured to interface with a system administrator 215. In embodiments, the system administrator 215 can be any user, owner, administrator, or other entity, or any combination of hardware and software that can be configured to perform the functions as discussed herein. Further, in embodiments, the system administrator 215 can be configured to connect to the application server 106 via any data connection or network. According to embodiments, one or more of the set of services 205 may need to be configured in order to initiate and/or execute applications served to the set of clients 260. In particular, the system administrator 215 can process, initiate, and/or otherwise configure a set of token services 280 via the security token management service 270 to configure and/or operate the set of services 205 along with an associated set of tokens 290. In embodiments, the set of token services 280 can be or include token services, mechanisms, portals, authorities, the set of tokens 290 and/or other associated token objects, and/or other resources such as token services associated with Kerberos™ token services, SAML (security assertion markup language) services including SAML assertions, Web Service (WS) token services including WS (web services) trust claims, Open ID token services, or a custom token such as a token generated by or associated with one or more of the set of services 205. Other token services, associated token objects, and/or other mechanisms can be used.

The application server 106 can host the security token management service 270 that can be configured to interface with the set of services 205 to acquire, configure, and manage the set of token services 280 via the security token management service 270. According to embodiments, each of the set of services 205 can request various token services via the security token management service 270. According to embodiments, the system administrator 215 can configure each of the set of services 205 using any one or more token services in the set of token services 280. In embodiments, the set of token services 280 can use, manage, generate, and/or require attributes such as user names, passwords, public/private keys, digital certificates, and/or other objects or attributes. For the services in set of services 205 that need access to the set of token services 280, the services can be configured to provide or identify their required or desired associated token services to the security token management service 270. In embodiments, the security token management service 270 can be configured to receive, register, and/or validate the request for token-based security services. For example, the security token management service 270 can compare the request received from the service to a stored record of valid or permitted token services required by that or similar services.

If the request is validated, the security token management service 270 can automatically access a set of token providers 250 to locate and register the application requesting the security token services with the appropriate or corresponding provider. For example, Provider X acting as a certification or issuing authority for tokens of Kerberos™ type can receive, decode, and validate the request for token service from an application in, or associated with, the set of services 205. One or more providers in the set of token providers 250 can then be accessed and registered to the requesting service(s)/application(s) to provide tokens of that requested type to the requesting entity, for use in the deployment of applications and/or services to the set of clients 290. Different services can request different token services or objects at different times, and can in embodiments automatically register that request via the security token management service 270, without a need for manual configuration of the token service, associated token object(s), and/or other associated resources of the security token platform being requested. In embodiments, various parameters used to configured the set of token services 280 can also or instead be manually specified by a systems administrator and/or other user, if desired.

Figure 3:
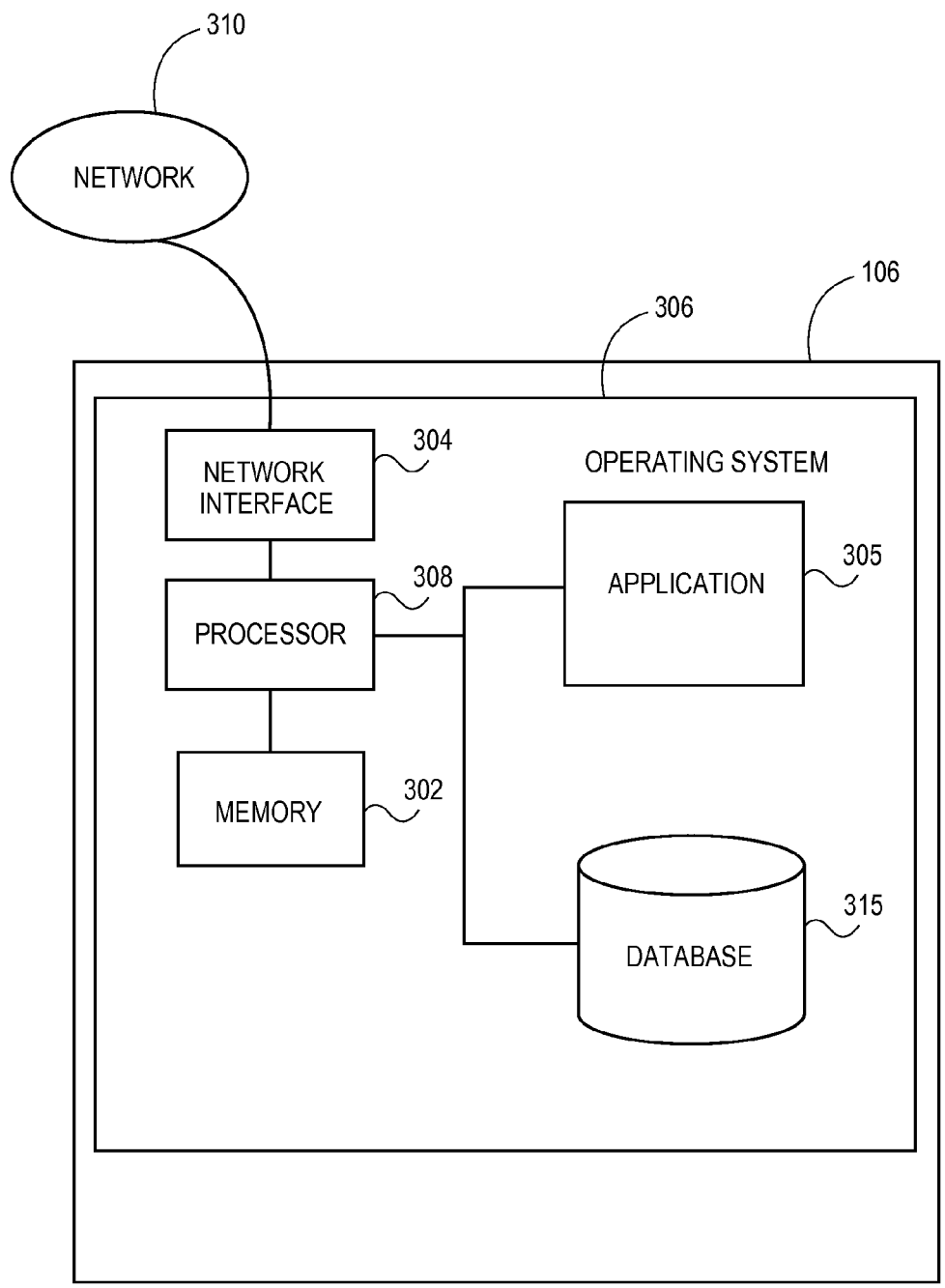
FIG. 3 illustrates an exemplary hardware configuration for an application server, according to various embodiments.

FIG. 3 illustrates an exemplary diagram of hardware and other resources that can be incorporated in the application server 106 configured to communicate with the set of clients 260, set of token providers 250, and/or other entities, services, or resources via one or more networks 310 and/or other networks or connections, according to aspects. Although FIG. 3 shows the components as part of the application server 106, it will be appreciated that the components can also be a part of the security token management service 270 and other entities.

In embodiments as shown, the application server 106 can comprise a processor 308 communicating with memory 302, such as electronic random access memory, operating under control of or in conjunction with an operating system 306. The operating system 306 can be, for example, a distribution of the Linux™ operating system, the Unix™ operating system, or other open-source or proprietary operating system or platform. The processor 308 can also communicate with a database 315, such as a database stored on a local hard drive, and a set of applications 305, to execute control logic and control the operation of the services and resources as described herein. The processor 308 can further communicate with a network interface 304, such as an Ethernet™ or wireless data connection, which in turn communicates with the one or more networks 310, such as the Internet or other public or private networks. Other configurations of the application server 106, associated network connections, and/or other hardware, software, and service resources are possible.

Figure 4:
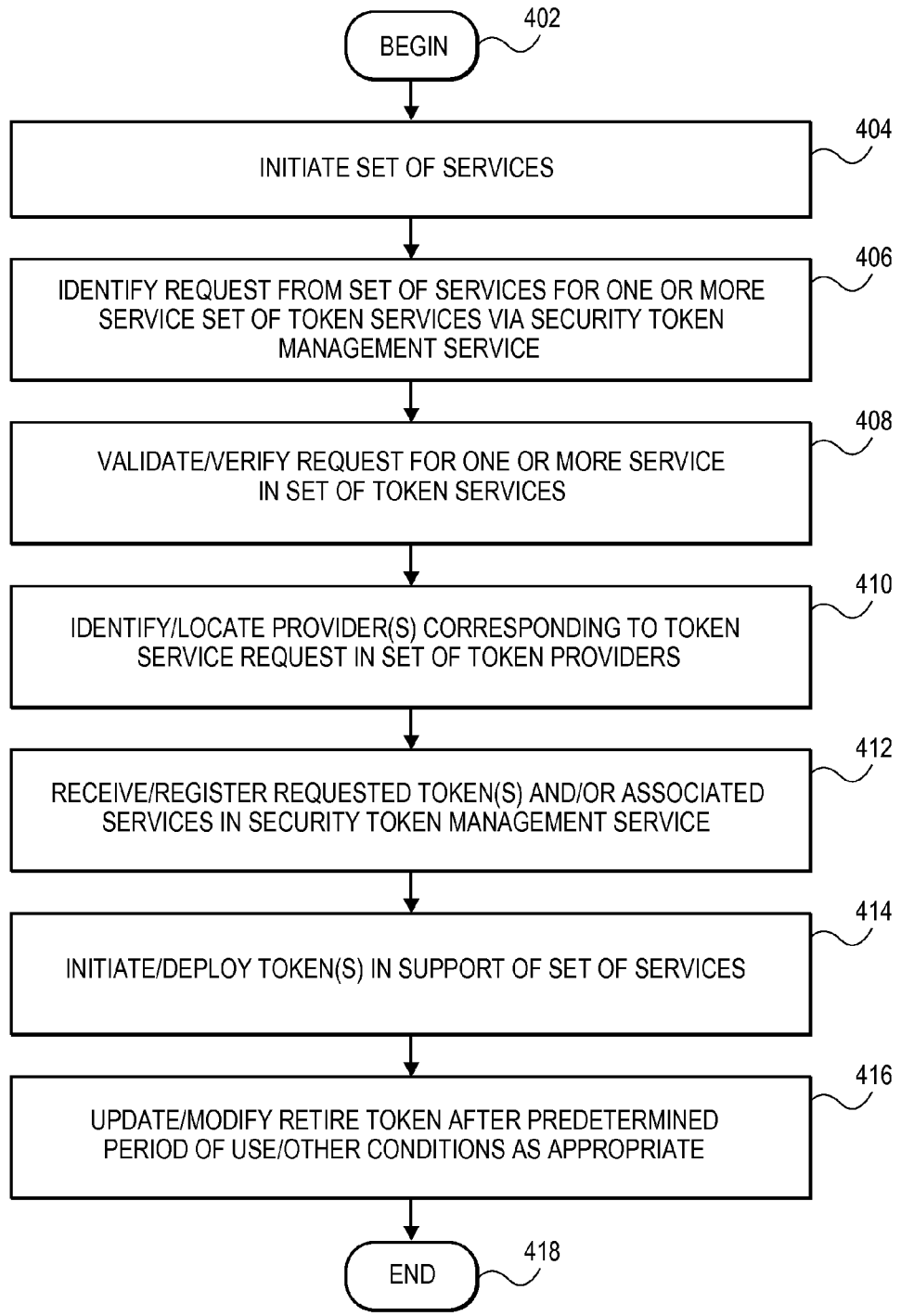
FIG. 4 illustrates a flowchart for managing various token services and configurations which can be managed via a dedicated token security management service, according to various embodiments.

FIG. 4 illustrates a flowchart of overall processing that can be used to generate and manage security token services, according to various aspects of the present teachings. In 402, processing can begin. In 404, the set of services 205 can be initiated, for instance by the systems administrator 215 and/or other user or operator, and/or by automatic, scheduled, and/or programmed mechanisms. In 406, a request from one or more of the set of services 205 for one or more token services in the set of token services 280 can be identified and/or received via the security token management service 270. For example, an instant messaging application and/or service operating in or as part of the set of services 205 can request a Kerberos™-type token for use in authenticating a user communication session or context. In 408, the security token management service 270 can receive, validate, and/or verify the request for a token and/or associated token service of that type, transmitted by that requesting application. In 410, the security token management service 270 can identify and/or locate the token provider or providers corresponding to the token service request from amongst the set of token providers 250, and can request the associated token(s) and/or service(s).

In 412, the security token management service 270 can receive and/or register the requested token or tokens and associated service(s) generated by the responding token provider or providers. In 414, the security token management service 270 can initiate, transmit, and/or otherwise deploy the requested token(s) to the requesting service in the set of services 205. In 416, the security token management service 270 can update, modify, and/or retire the requested token(s) and/or services, based on a predetermined period of use of those tokens or services, and/or based on other conditions, as appropriate. In 418, processing can repeat, return to a prior processing point, jump to a further processing point, or end.

The foregoing description is illustrative, and variations in configuration and implementation may occur to persons skilled in the art. For example, while embodiments have been described in which the application server 106, the security token management service 270, and other entities may reside in a single server or platform, in embodiments the application server 106, and/or other entities and associated logic can be distributed among multiple servers, services, or systems. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
executing, by a processing device of an application server, a security token management service to manage disparate token services for a plurality of services provided by the application server to support a set of clients separate from the application server;
receiving, by the processing device executing the security token management service, a request for at least one token service of the disparate token services, the request received from a requesting service of the plurality of services;
validating the request for the at least one token service;
identifying a corresponding token provider for the at least one token service, wherein the corresponding token provider is selected from a plurality of token providers registered with the security token management service;

acquiring at least one token from the corresponding token provider for the at least one token service; and deploying the at least one token service to the requesting service.

2. The method of claim 1, wherein the requesting service comprises at least one application served from the application server to a client in the set of clients.

3. The method of claim 2, wherein the at least one application comprises at least one of a messaging application, an email application, a media application, a database application, a social networking application, or an e-commerce application.

4. The method of claim 3, wherein the security token management service is hosted in the application server.

5. The method of claim 1, wherein the at least one token comprises at least one of a Kerberos token, a security assertion markup language (SAML) assertion, a web services (WS) trust claim, an Open ID token, or a custom token.

6. The method of claim 1, further comprising serving the requesting service to at least one client in the set of clients via a network.

7. The method of claim 6, further comprising monitoring the usage history of the at least one token service by the set of clients.

8. The method of claim 7, further comprising at least one of updating or terminating the at least one token service in view of the usage history.

9. The method of claim 1, wherein the request for at least one token service comprises a request for a plurality of token services.

10. A system comprising:

a memory;

an interface to a set of clients, the interface communicably coupled to the memory;

a processing device communicably coupled to the memory, the processing device to execute an application server from the memory and to communicate with the set of clients via the interface; and a security token management service executable from the memory by the processing device as part of the application server, the processing device to:

manage disparate token services for a plurality of services provided by the application server to support the set of clients;

receive a request for at least one token service of the disparate token services, the request received from a requesting service of the plurality of services;

validate the request for the at least one token service;

identify a corresponding token provider for the at least one token, wherein the corresponding token provider is selected from a plurality of token providers registered with the security token management service;

acquire at least one token from the corresponding token provider for the at least one token service; and deploy the at least one token service to the requesting service.

11. The system of claim 10, wherein the requesting service comprises at least one application served from an application server comprising the system to a client in the set of clients.

12. The system of claim 11, wherein the at least one application comprises at least one of a messaging application, an email application, a media application, a database application, a social networking application, or an e-commerce application.

13. The system of claim 12, wherein the security token management service is hosted in the application server.

14. The system of claim 10, wherein the at least one token comprises at least one of a Kerberos token, a security assertion markup language (SAML) assertion, a web services (WS) trust claim, an Open ID token, or a custom token.

15. The system of claim 10, wherein the processing device is further to serve the requesting service to at least one client in the set of clients via a network.

16. The system of claim 15, wherein the processing device is further to monitor the usage history of the at least one token service by the set of clients.

17. The system of claim 16, wherein the processing device is further to at least one of update or terminate the at least one token service in view of the usage history.

18. The system of claim 10, wherein the request for at least one token service comprises a request for a plurality of token services.

* * * * *